US005171038A

United States Patent [19]

Bowler

[11] Patent Number: 5,171,038

[45] Date of Patent: Dec. 15, 1992

[54] INTERACTIVE ADVERTISING DEVICE

[76] Inventor: Kevin M. Bowler, P.O. Box 3216, Westport, Conn. 06880

[21] Appl. No.: 710,239

[22] Filed: Jun. 3, 1991

Related U.S. Application Data

[63] Continuation of Ser. No. 510,444, Apr. 18, 1990, abandoned.

[51] Int. Cl.5 .......................... B42D 1/00; G03B 25/00

[52] U.S. Cl. .......................... 281/15.1; 352/51; 352/52; 352/99

[58] Field of Search .......................... 352/87, 99, 50, 51, 352/52; 281/15.1

[56] References Cited

U.S. PATENT DOCUMENTS

| | | | |
|---|---|---|---|
| 259,950 | 6/1882 | Hoevenbergh | 352/99 |
| 853,699 | 5/1907 | Keen | 281/15.1 |
| 1,957,782 | 5/1934 | Hyde | 352/51 |
| 3,159,405 | 12/1964 | Brambier | 352/99 |
| 3,168,742 | 2/1965 | Chambers | 352/99 |
| 3,593,432 | 7/1971 | Reynolds | 352/99 |
| 3,740,128 | 6/1973 | Adler | 352/99 |
| 3,747,087 | 7/1973 | Harrison, III et al. | 352/52 |
| 5,029,997 | 7/1991 | Faroudja | 352/52 |

FOREIGN PATENT DOCUMENTS

| | | | |
|---|---|---|---|
| 609520 | 1/1935 | United Kingdom | 352/99 |
| 1004456 | 3/1952 | France | 352/99 |
| 925 | of 1868 | United Kingdom | 352/99 |
| 828346 | 2/1960 | United Kingdom | 352/99 |

*Primary Examiner*—Douglas D. Watts
*Assistant Examiner*—Hwei-Siu Payer
*Attorney, Agent, or Firm*—Handal & Morofsky

[57] ABSTRACT

In particular, the inventive advertising device comprises a stack of sheets stacked one over the other into a deck. These sheets are bound together by a pair of staples. The top side of successive sheets are imprinted with successive frames in a motion sequence. This motion sequence is selected for its ability to stimulate viewers. For example, it may be the winning hit in a world series or the winning goal in a hockey game, as illustrated. Also imprinted on the sheets is advertisement in various forms, for example, coupons, an advertisement motion scene, etc. To view the scene, one arches the inventive device by applying a bending force with the left hand and right hand. Each individual sheet is allowed to pass in succession stopping momentarily against the friction caused by the thumb. Thus motion appears from the successive imprinted images.

13 Claims, 8 Drawing Sheets

INTERACTIVE ADVERTISING DEVICE

This application is a continuation of application Ser. No. 510,444, filed Apr. 18, 1990, now abandoned.

TECHNICAL FIELD

The present invention relates to advertising devices of the type designed to encourage retention and instill reader response. It may take the form of a premium or catalog.

BACKGROUND

Over the years, the increasing sophistication of consumers has been matched step by step by the advertising industry. A century ago, the advertising business was in its infancy and advertisements in newspapers and magazines had barely advanced from the unadorned classified listings of the prior century to simple line drawings that were meant to inform. At that time, advertisers were just beginning to harness illustration as a means of making a product attractive.

Despite the tremendous advances in advertising strategies and devices over the last century, advertising remains particularly vulnerable to various factors which affect its effectiveness. In particular, advertising material mailed or otherwise introduced into the home is seldom looked at and often thrown into the waste basket without the envelope even being opened.

Another method of distributing advertising to consumers is enclosing the advertising with products purchased by the consumer. Thus, a mail order package received from a nursery might have advertising brochures of garden tools included with it. A box of shoes might have an advertisement for a particular shoe polish enclosed with the product purchased. Such advertisements are also often ignored, being thrown out with the package.

In an attempt to overcome this problem, manufacturers have turned to coupons. However, given the increased competitiveness of modern industry, the escalation of costs in the service sector, and increased general levels of prosperity in society today, such coupons have lost much of their appeal. They have become expensive to process and are eating away at increasingly narrow profit margins. Coupons have become so commonplace and have so over saturated the market that the consumer fails to perceive any real value in the coupon. Quite simply, they are passive advertising media and fail to excite the consumer and have thus lost much of their effectiveness.

SUMMARY OF THE INVENTION

In accordance with the invention, the above-identified inadequacies of prior art advertising devices are eliminated. To be most effective, an advertising device must have some perceived value. This is accomplished by the present invention through building inherent value into the advertising device itself, causing the consumer to perceive the advertising material as having intrinsic worth.

To be effective the advertising device must also be stimulating. The invention accomplishes this by making use of common and desirable natural stimuli. The combination of perceived value and consumer stimulation result in creating a favorable mood in the individual receiving the advertising device, this favorable mood becomes associated with the advertising material contained therein. At the same time, passivity is eliminated and viewer participation is obtained.

To exist as an individual an organism is forced to compete with other organisms both intra and inter-species. This competition is the result of the limitations of available resources. Those organisms that become most competitive and thus efficient at acquiring resources have a better chance of survival. Thus, competitiveness has evolved to become an intrinsic human trait.

Since very early in the evolutionary development of animals, feelings of well being, pleasure, and the like in response to certain stimuli have evolved as a means for causing organisms to follow courses of action which result in self-preservation. These include the instincts to hunt, defend territory, mate, protect the young, and so forth. While largely over-layered with societal-induced behavioral patterns and calculated rational evaluations and courses of action, to a large measure, man has retained a sensitivity to numerous instinctive and other related stimulations.

In particular, in order to survive, historically, man has had to hunt and gather sustenance from the earth. Such work involves physical exertion and, in prehistoric times, such exertion must have strained man to the limits of his physical ability, given the fact that the human body typically deteriorated to the point that human expectancy was less than thirty years.

To stimulate man to so exert himself, the brain typically releases endorphines which give the individual a sense of pleasure or well-being. Today, this sense of well-being and pleasure has been extensively commented upon in connection with various sports, including jogging, working out and the like. Indeed, it is believed that stimulation creates the psychological support for extended physical activity, even though such activity is now quite divorced from any need for survival.

Still another aspect of stimulated pleasurable response occurs in connection with the capture of game and related acts. For example, catching of a fish by a fisherman is such a thrilling and stimulating experience that devotees of this sport awaken before dawn and drive for hours to experience this particular sort of stimulation. Again, this is so in spite of the fact that survival hardly requires exerting oneself to such lengths in order to obtain food.

Yet another primeval stimulated response is the territorial instinct. Naturally, all mammals, man included, show some form of territorial instinct. The territorial instinct in man involves the association of territory with a group of individuals. Given the extent to which society has developed, groups have, historically, been as large as cities and small countries and, in very recent times, groups have been much larger. In view of this development, the territorial instinct in many has often exhibited itself in such mega-natural ways as high technology war fare or the like. If we look to earlier times in western civilization or relatively less developed societies today, however, we see their "wars" taking more of a game-like aspect, something which makes them much more resemble the relatively far less lethal contests of the animal kingdom. Indeed, the attacking of civilian populations even in the Western world did not first occur until the first use of aircraft for bombing by the Germans during World War I, something for which they were widely condemned by the rest of the world.

As noted above, competitive contests commence due to internal biological chemical controls and stimuli which give the participants a feeling of well-being and pleasure. In one area, today, this non-lethal competitiveness and territorial continuousness is still quite strong. In particular, in the area of professional and amateur sports, fans follow the exploits of a particular team or teams or individual(s) with whom they associate and identify with. They cheer their team on and derive pleasure for themselves in the process. Most fans have a connection between the city associated with the particular team and themselves, the city either being their home town or the place where they live, or the like.

Even after a game is over, the fans tend to talk with each other and play out the particularly important aspects of the game with words and actions all calculated to extend the feelings of pleasure and well-being that were associated with the game. Indeed, there are particular plays in all of the sports that are talked about for many years. These particular plays, although of short duration in time, live on and on in the minds, memories, stories and recollections of loyal fans. These plays become so ingrained in the fan's memory that years later many fans can recall the exact names, positions, actions and responses of numerous players involved in a particularly exciting and/or meaningful play. Thus, the evolved instinct of loyalty to the group, as well as the evolved instinct of competition manifest themselves most often and sometimes dramatically in the modern world in the form of sporting events and fan loyalty.

In accordance with the present invention, these very basic, instinctive reactions are harnessed into an exciting, stimulating device which recreates particular plays in order to instill a feeling of well-being and introduce the product into the fans thoughts at this time. Objectives of high retention, good recall and favorable response are served by the inventive device.

The inventive device is comprised of a stack of sheets bound together along one edge of the stack. The top face of each sheet is imprinted with an image. The image depicts a frame from a motion sequence. The user riffles through the sheets viewing each image imprinted on each sheet as it passes through his field of sight. Because each image represents a frame from a motion sequence viewed in succession, the images appear to produce motion.

The images can be printed on the sheets from motion picture film, video tape or other medium. The basic process in printing in color requires each frame to be separated into one of four elemental colors, namely, red, black, yellow, and blue from a video tape or other image source. Each color element is then printed on the sheets, an over-lapping of these primary colors produces the variety of colors contained in the image. The sheets are then trimmed and bound in a stack. Each sheet has an image corresponding to a particular frame of the motion sequence imprinted on it. The stack contains sheets imprinted with successive frames of the motion sequence.

BRIEF DESCRIPTION OF THE DRAWINGS

One way of carrying out the invention is described in detail below with reference to drawings which illustrate only one specific embodiment of the invention and in which.

DETAILED DESCRIPTION OF DRAWINGS

Figure 2:
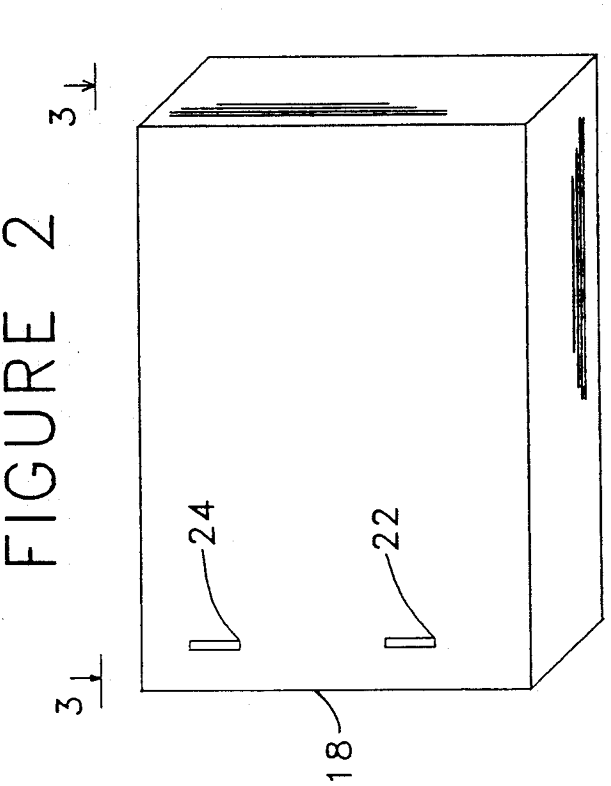
FIG. 2 is a bottom plan view of the embodiment.
Figure 3:
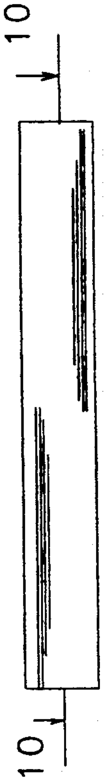
FIG. 3 is a side plan view of the inventive advertising device along lines 3—3 of FIG. 2.
Figure 1:
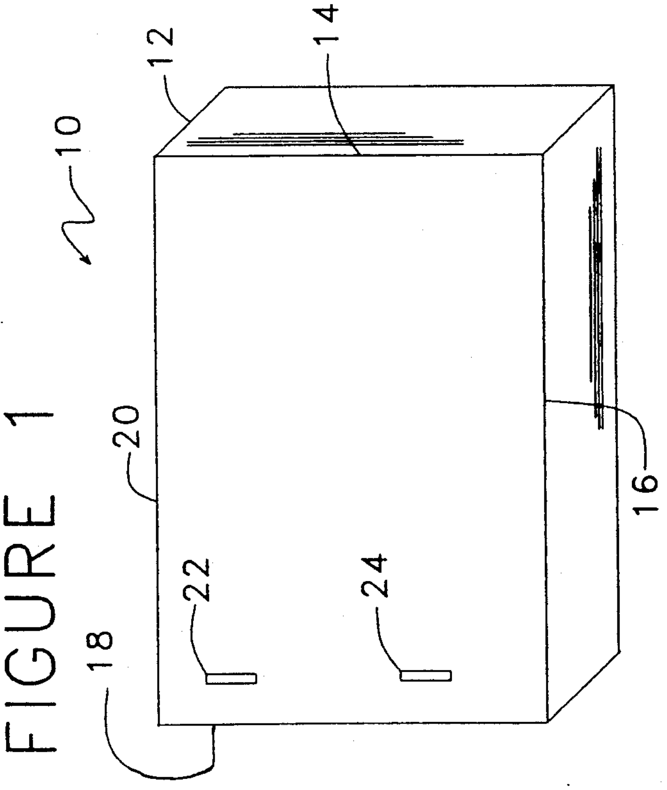
FIG. 1 is a perspective view of an embodiment of the inventive advertising device.

Referring to FIGS. 1-3, the inventive advertising device 10 comprises a stack of sheets 12 made of paper, cardboard, or the like. Coated paper and plastic, glossy or non-glossy, may be used for sheets 12.

Sheets 12 are all the same size in accordance with the embodiment of FIG. 1. Sheets 12 are stacked one over the other into a deck, with their edges 14, 16, 18 and 20 substantially overlying each other. Sheets 12 are bound together by a pair of staples 22 and 24 as illustrated in FIG. 2, which may be made of metal, or by another suitable fastening device or devices. So-called perfect binding, which involves putting a glue edge binding and a wraparound cover may be used in accordance with the invention, as may other binding techniques.

As can be seen in FIGS. 4-8, the top sides of successive sheets 26, 28, 30, 32, and 34 are imprinted with successive frames in a motion sequence. This motion sequence is selected for its ability to stimulate viewers. For example, it may be the winning hit in a world series, the winning goal in a hockey game, as illustrated, or the catching of a particularly exciting fish.

In the example illustrated in FIGS. 4-8, it is contemplated that the entire scoring of the hockey goal would be included. For purposes of brevity and illustration, only the last part of the sequence is shown.

Figure 4:
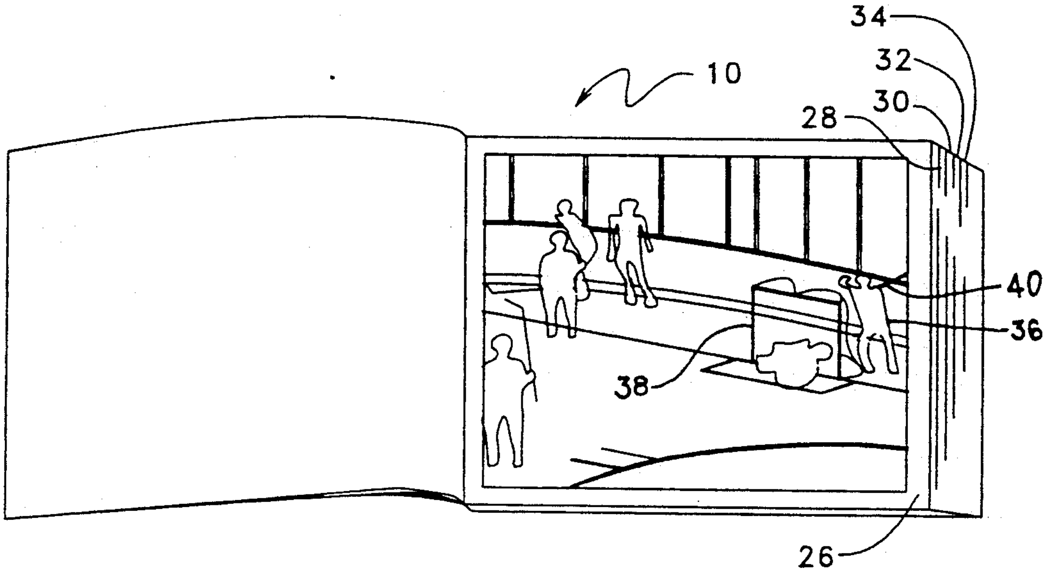
FIG. 4 is the first in a sequence of perspective views showing individual sheets of the inventive advertising device during use.
Figure 5:
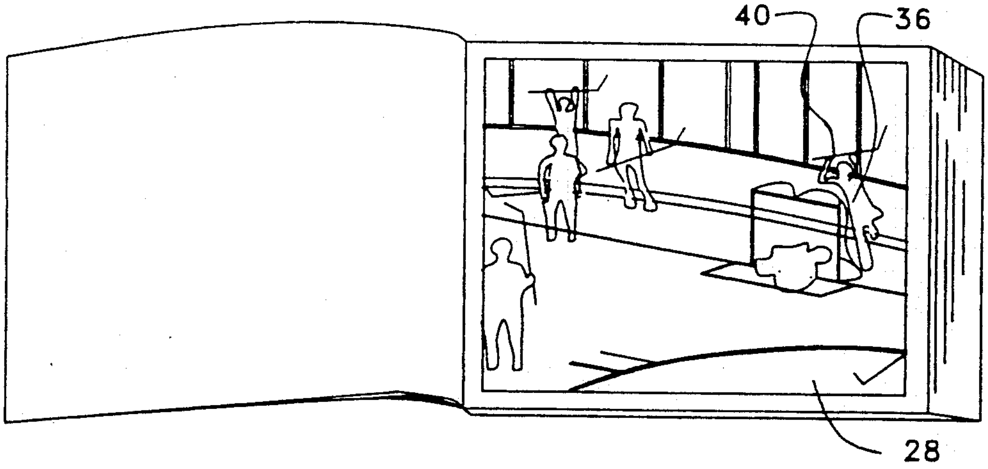
FIG. 5 is the second in a sequence of perspective views showing individual sheets of the inventive advertising device during use.
Figure 6:
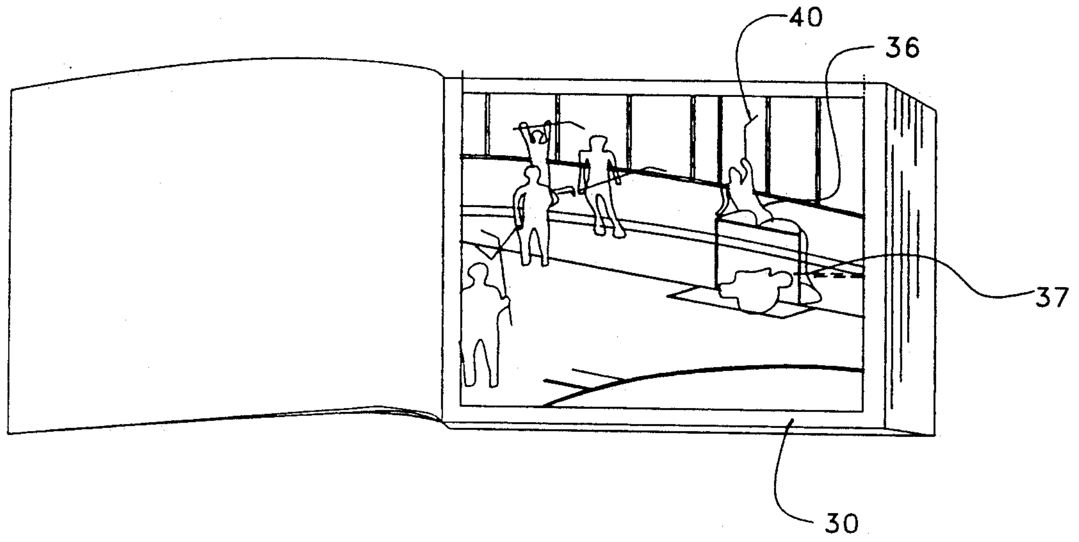
FIG. 6 is the third in a sequence of perspective views showing individual sheets of the inventive advertising device during use.
Figure 7:
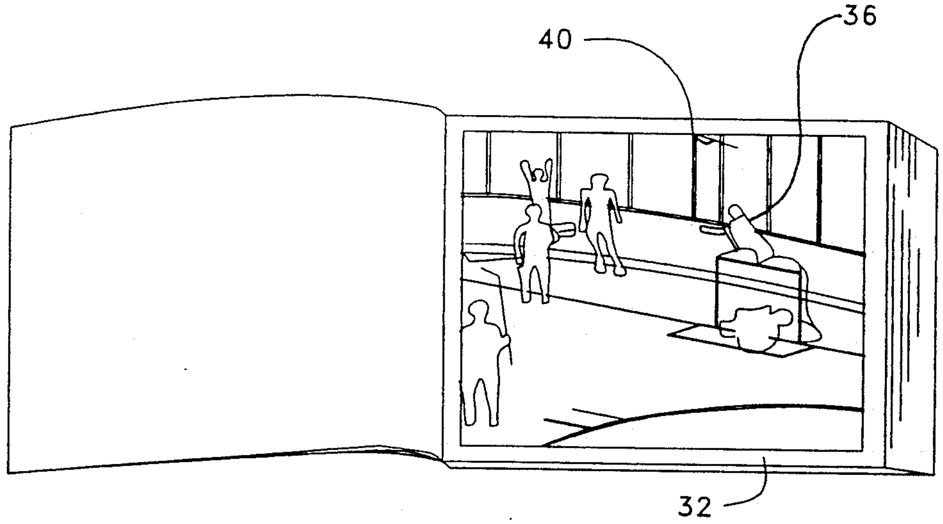
FIG. 7 is the fourth in a sequence of perspective views showing individual sheets of the inventive advertising device during use.
Figure 8:
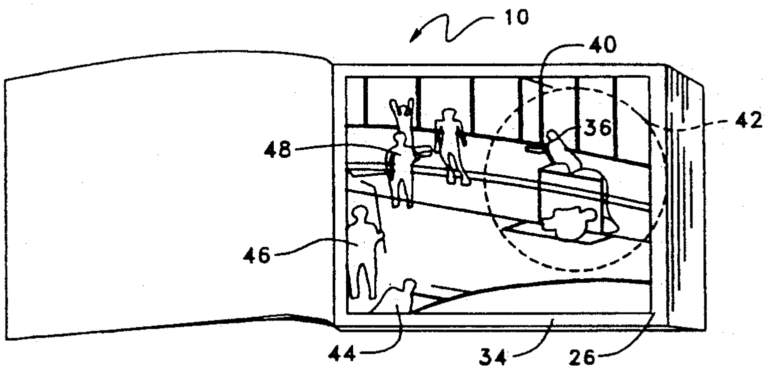
FIG. 8 is the fifth in a sequence of perspective views showing individual sheets of the inventive advertising device during use.

Referring to FIG. 4 in the illustrated sequence, a hockey goal has just been made and a player 36 has become extremely excited. Player 36 has skated around the back of a goal 38. As shown in FIG. 5, player 36 then jumps in the air, swinging a hockey stick 40. In FIG. 6, player 36 continues the swing of hockey stick 40. Player 36 then throws hockey stick 40 into the air, as illustrated in FIG. 7, and then continues skating as illustrated in FIG. 8. This may be the end of the sequence, or, in accordance with the preferred embodiment, it may be followed by an animated commercial.

It is contemplated that the sports or other stimulating sequence will be about twenty-five to thirty frames in length, leaving several frames for still advertising material in a typical thirty-two sheet construction of device 10.

In accordance with the present invention, sequences from existing motion picture and video-tape footage are framed such that the selected image centers the particular action of interest in the field of sight for the advertising device as appears more fully below. As can be seen in FIG. 8, the action of interest zone 42 centers around the goal 38, player 36 and hockey stick 40. The other players 44, 46 and 48 are not of primary interest and thus are not in zone 42.

Figure 9:
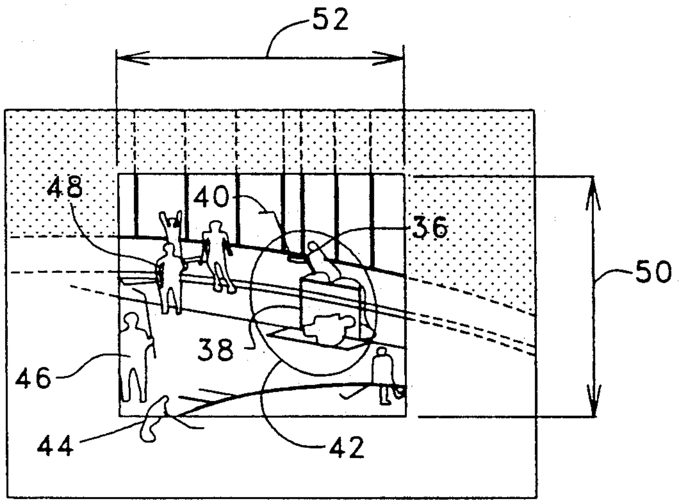
FIG. 9 illustrates scene cropping and sizing in accordance with the invention.

Referring to FIG. 9, which shows an unedited frame of the desired motion sequence, the action depicted in the FIG. 8 frame shows the goal 38, player 36 and hockey stick 40 and a large surrounding area of the hockey rink. By cropping and blowing-up a portion of the image defined by vertical limits 50 and horizontal limits 52 in such a way as to place the action of interest zone 42 in the center of the inventive device's primary field of view 54 (as is discussed more fully below) and substantially fill primary field of view 54, maximum spatial effectiveness will be obtained. The result is the final frame illustrated in FIG. 8. By using the technique illustrated by FIG. 9 of placement, cropping and blowing up the frame to highlight the action of interest zone 42, the relatively short duration of the motion sequence could illustrate the most interesting particulars of the sports scene and elicit the intended motivation of the sports-fan.

Similarly, the timing and selection of the individual sequences can be edited to show those individual pictures that result in a smooth display of the motion sequence which generates the overall excitement of the sports scene. For example, rather than showing the entirety of a ninety yard kick-off return in a famous football game, the timing of the scene may be edited so that a smooth display of key blocks and missed tackles are shown in succession as the ball carrier runs down field and scores the touch-down. For example, if all that is going on in the motion sequence if a player making a long run, two or three frames can plot out his run over, for example, sixty yards. If this is followed by a missed tackle, three additional successive frames can show the approach, failure to make contact and falling away of the unsuccessful attacking player over a short, for example, four yards of running. A single frame may then be used to show the runner advancing with the ball another fifteen yards and then a remaining twenty or so frames can illustrate in great detail the ending collision, although it may last only a second or two.

Thus, the inventive process involves viewing a sequence of full frames such as that illustrated in FIG. 9 from existing footage or special footage shot for the express purpose of making the inventive advertising device, identifying the action of interest zone 42 over several frames, identifying an enlargement value that results in filling the field of view 54 of the inventive device 10 and then selecting frames as detailed above.

As a final refinement, enlargement value may be smoothly varied from frame-to-frame to get the desired impact and also, if desired, maintain an action of interest zone 42 at relatively constant size or a desired change in size as a function of time.

Figure 10:
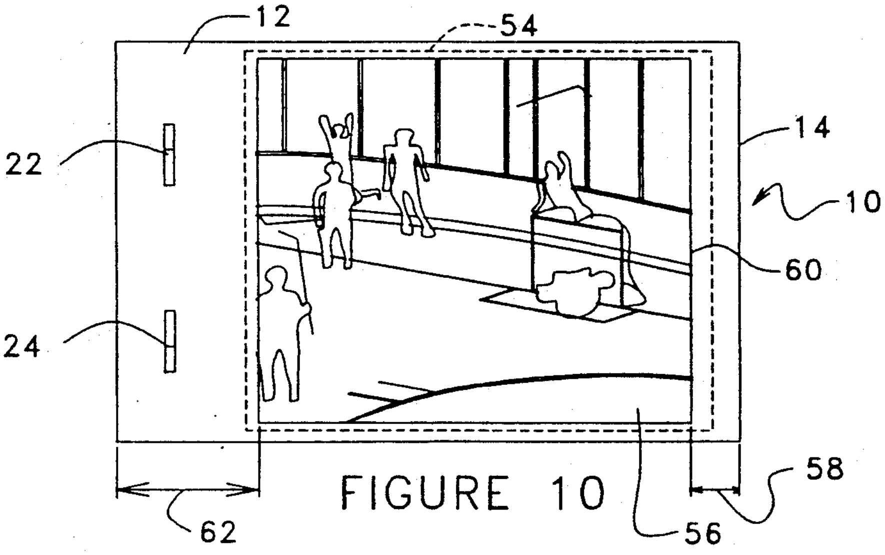
FIG. 10 is a top view of an individual sheet of the inventive advertising device along lines 10—10 of FIG. 3.

Referring to FIG. 10, in accordance with the present invention, an image 56 of the exciting sports scene is disposed on each of the individual sheets 12. The final selected image 56 is imprinted somewhat off-center on sheet 12 so that the margin 58 between the edge 60 of the image 56 and the unstapled edge 14 of the sheet 12 is very narrow or non-existent. The margin 62 between the opposite edge 64 of the image 56 and the stapled edge 18 of the sheets 12 is wide enough to allow staples 22 and 24 to bind sheets 12 in a stack to each other (as illustrated in FIG. 1). Thus, the image 56 is positioned on the sheet 12 so that the primary field of view 54 contains the entire image 56.

Figure 11:
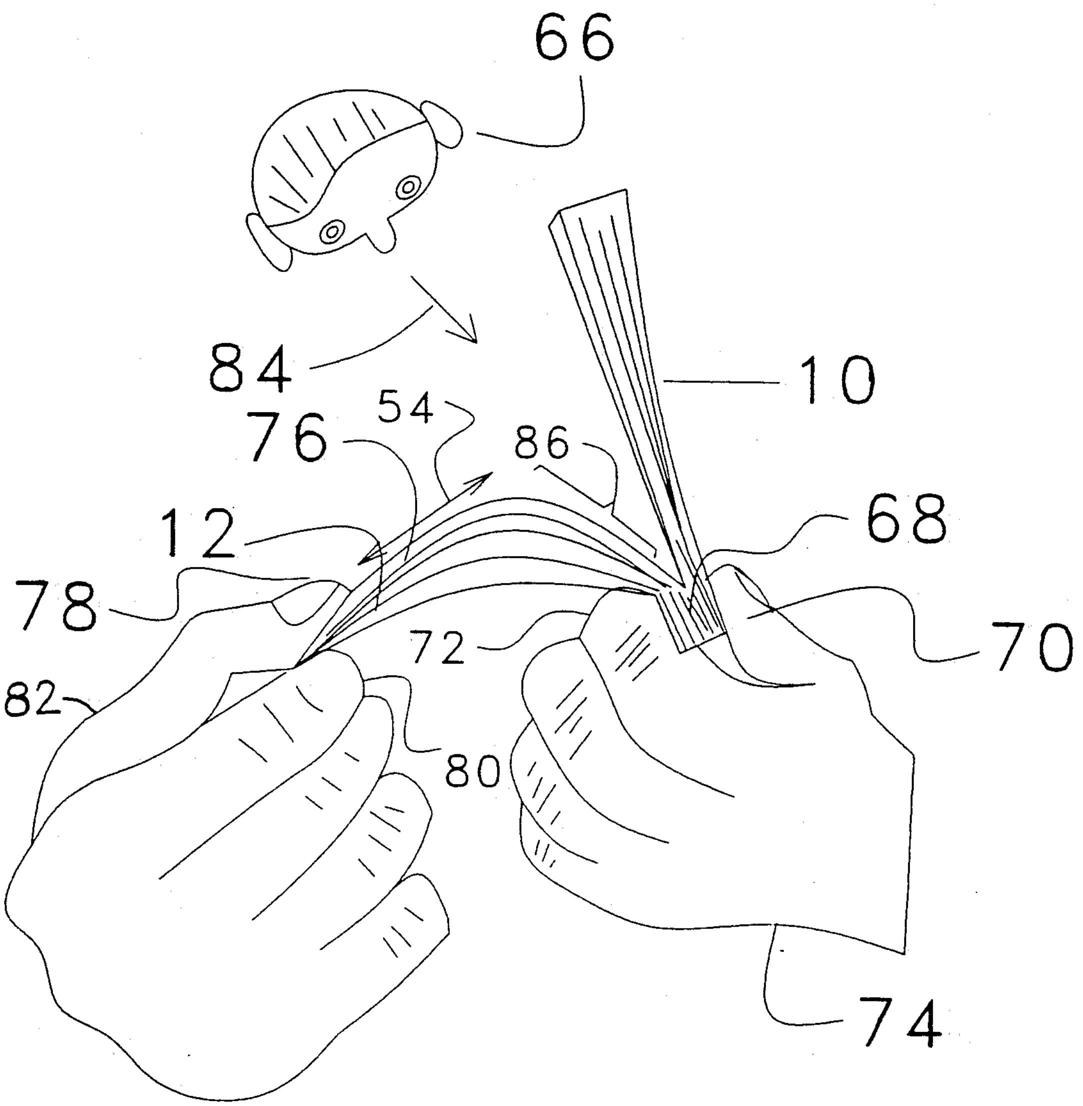
FIG. 11 is a perspective view showing the operation of the inventive advertising device.

Referring to FIG. 11, to use the device, the user 66 grasps the stapled bound edge 68 of the inventive device 10 between the bottom of the thumb 70 and the side of the index finger 72 of the left hand 74 at the same time the unstapled edge 76 of device 10 is placed between the bottom of the tip of the thumb 78 and the side of the index finger 80 of the right hand 82 of user 66. To view the scene, one riffles through the device 10 as illustrated in FIG. 11, arching the inventive device 10 and by applying a bending force with left hand 74 and right hand 82. Each individual sheet 12 is allowed to pass in succession under thumb 78 of right hand 82, the image imprinted thereon being seen momentarily because of the holding friction caused by the thumb 78 of the right hand 82. As each sheet 12 is released by thumb 78 of right hand 82, successive images in successive action of interest zones 42 imprinted on sheets 12 momentarily enter the primary field of view 54 and become visible to the user 66 looking along the line of sight 84. Thus, the images imprinted on the sheets 12 appear to produce motion. The primary field of view 54 is limited due to the fact that bending of the device 10 during use results in causing the viewer to view region 86 at an oblique angle, resulting in degraded viewing characteristics.

In accordance with the invention, the sides of the pages opposite the animation may contain catalog information or highlight specific products. Moreover, one or more of the pages of the inventive device may be a game piece, such as a lottery ticket, a scratch off game piece, contest entry or the like.

Alternative embodiments are illustrated in FIGS. 12–18. Generally, similar parts or parts performing analogues corresponding or identical functions are seen numbered herein with numbers which differ from those of the earlier embodiment by multiples of one hundred.

Figure 12:
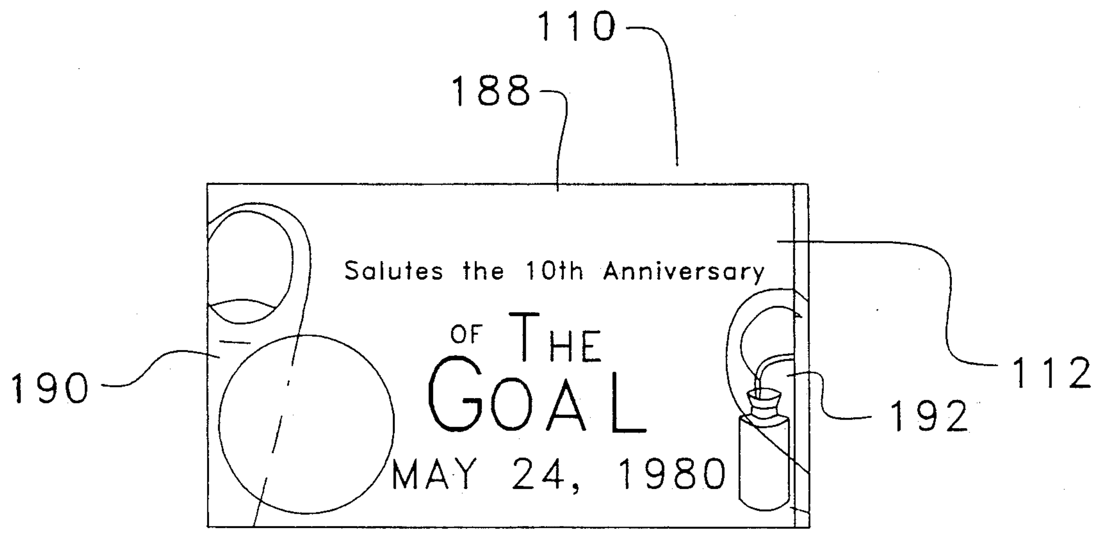
FIG. 12 is a top plan view of an alternative embodiment of the inventive advertising device.

In accordance with the present invention, an alternative embodiment 110 includes an illustration on the front cover as shown in FIG. 12 for the purpose of illustrating and directing use by a user. This is a top view of the inventive device 110. An illustration printed on the front cover 188 depicts the side of a thumb 190 of the left hand of a user and the thumb tip 192 of the right hand of the user. By placing the corresponding digits on these illustrations, in the orientation illustrated, a user will grasp the inventive device correctly for its intended use. Cover 188 may also include advertising material 189, as illustrated in FIG. 12.

Figure 13:
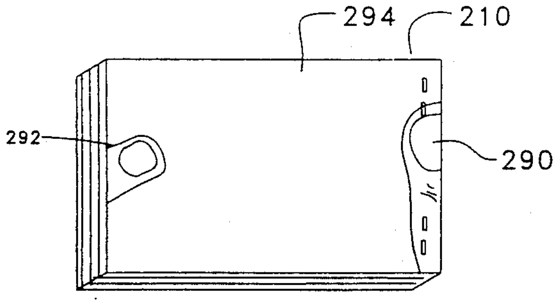
FIG. 13 is a perspective view from the bottom of another alternative embodiment of the inventive advertising device.

In accordance with a further alternative preferred embodiment of the invention, an animated advertising motion sequence is printed on sheets 212 on their sides opposite the sides on which the primary motion sequence such as that illustrated in FIGS. 4–8 is illustrated. FIG. 13 is a bottom view of such an alternative embodiment of the inventive device 210 and shows illustrations printed on the back cover 294 of the right hand thumb tip 292 and the left hand thumb side 290 which illustrate how to grasp and use the device. Alternatively or in addition, text may be used. This alternative embodiment of the present invention provides the opportunity for twice as much motion footage as opposed to the embodiment of motion printing on only one side. This second scene can also be a continuation of the first scene, a separate second sports scene, or can be utilized by the advertiser as either a short cartoon advertisement, or the reconstruction of an advertisement used by the advertiser in another medium which is familiar to the sports fans.

Figure 14:
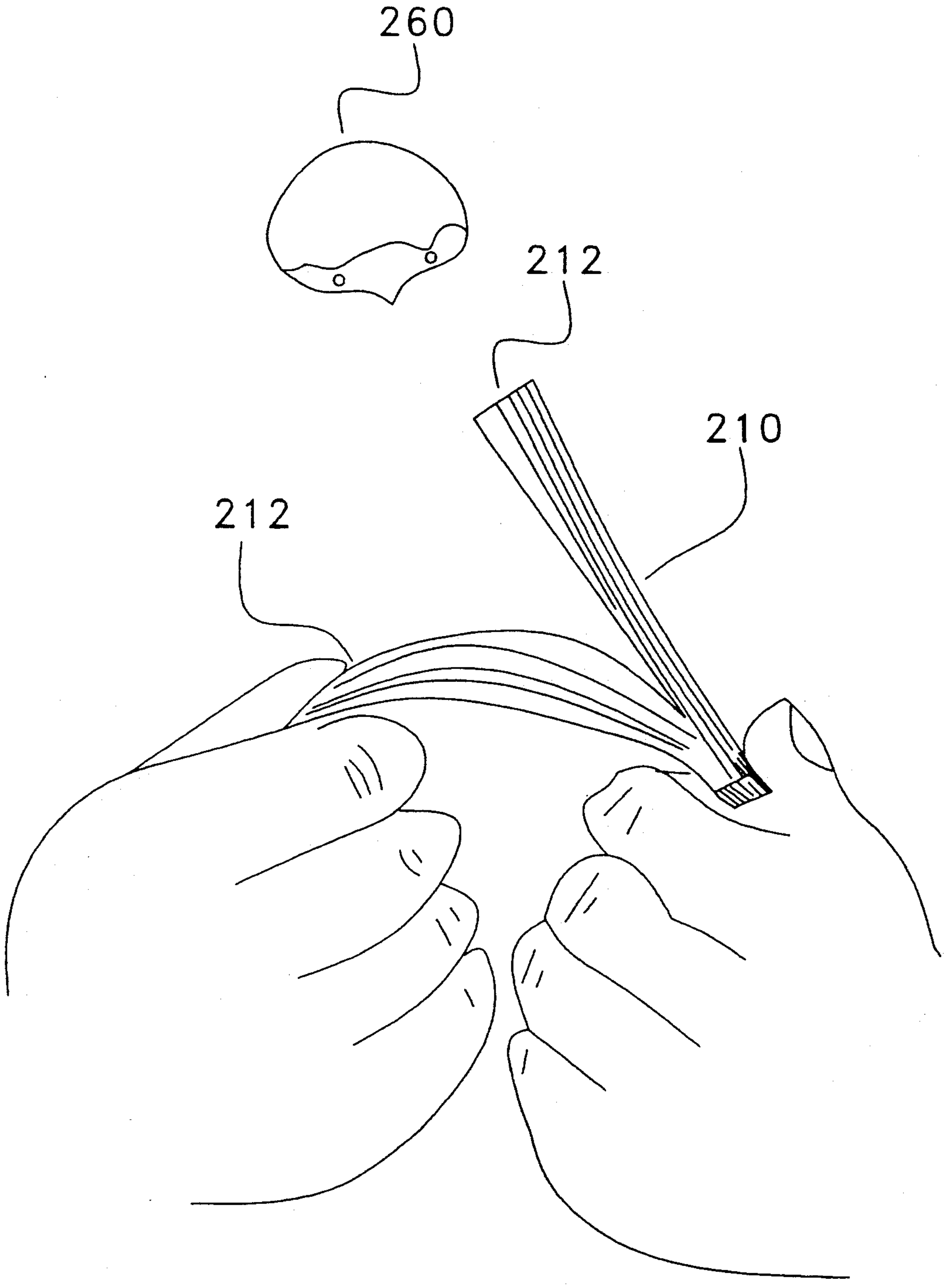
FIG. 14 is a perspective view showing alternative operation of the inventive advertising device of FIG. 13.

As illustrated in FIG. 14, to view the second scene the viewer 260 flips the inventive device 210 over to riffle the sheets 212 in the reverse direction. Thus, the inventive device 210 may also provide for a primary sports scene and a second sports scene or advertisement. Also, the action of riffling the sheets 212 backwards will tend to insure the integrity of the inventive device 210 as the individual sheets 212 are bent back into shape.

Figure 15:
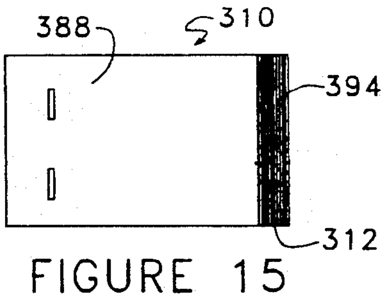
FIG. 15 is a top plan view of yet another embodiment of the inventive advertising device.
Figure 16:
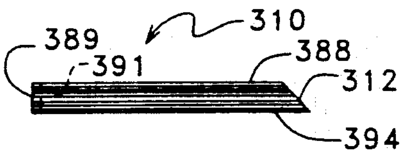
FIG. 16 is a side view of the embodiment of FIG. 15.

Another alternative embodiment of the inventive advertising device 310 is illustrated by FIGS. 15 and 16. The stack of sheets 312 are dimensioned such that the top sheet 388 is slightly shorter than the next sheet underneath it and so on until the bottom sheet 394 is reached. Thus, each successive sheet of the stack of sheets 312 is slightly longer than the sheet immediately preceding it. In this configuration the top sheet 388 is the shortest and the bottom sheet 394 is the longest. Such a dimensioning of the stack of sheets 312 will enhance the riffling action of the inventive device 310.

Figure 17:
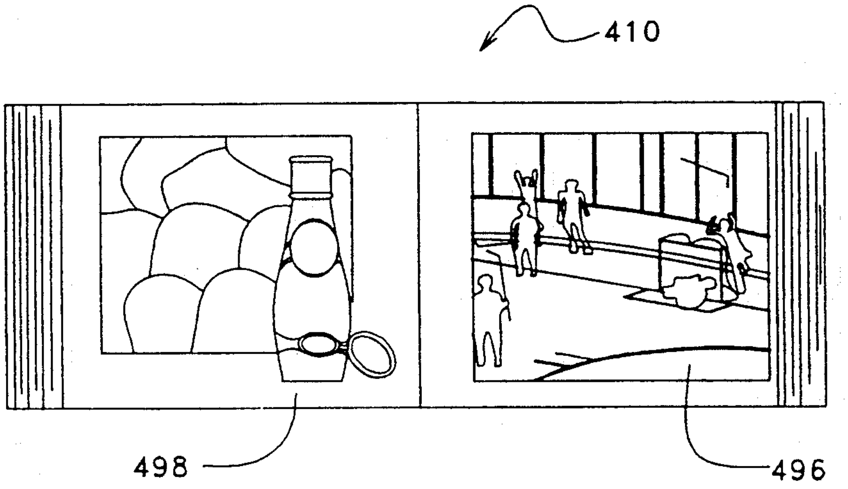
FIG. 17 is a top plan view of an individual sheet of still another alternative embodiment of the inventive advertising device.
Figure 18:
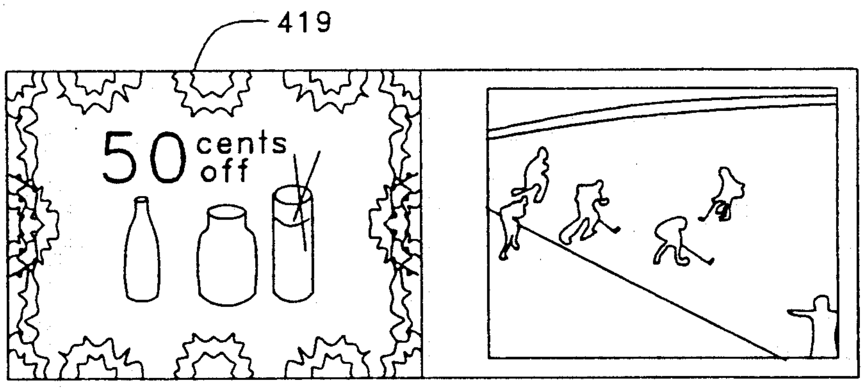
FIG. 18 is a top view of a second individual sheet of the embodiment of FIG. 17.

As illustrated in FIGS. 17–18, inventive advertising device 410 which includes sports sequence images 496 and advertising images 498 in the manner of the embodiment of FIG. 13, may also include after the advertising sequence, a coupon 499, mail away post card, or the like.

INDUSTRIAL APPLICABILITY

Generally images for the inventive device may be taken directly from existing photographic film footage and put through a color separation process to generate red, yellow, blue and black halftone images. These images can then be used to expose printing plates.

In working from video, separation may be generated by numerous techniques, and using two successive fields to generate individual color components for printing a print of the raster lines of two successive fields of a single video frame as shown in phantom lines 37 in FIG. 6. Possibilities include a video film printer such as that used in the computer animation field, or storage of video frames in computer random access memory, and processing the same by computer to generate the components corresponding to printing ink colors.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. A method of making an advertising device, comprising the steps of:

(a) gathering a plurality of flexible planar members having obverse and reverse sides;

(b) positioning said flexible planar members one on top of the other in a stack with one of said flexible planar members positioned at the top of said stack and another of said flexible planar members being positioned at the bottom of said stack and the remainder of said flexible planar members being positioned between said top and said bottom flexible planar members with the reverse of said top flexible planar member being adjacent to the obverse of the next flexible planar member in said stack and the obverse of said bottom flexible planar member of said stack being adjacent to the reverse of the flexible planar member above said bottom flexible planar member, and the remaining flexible planar members being positioned in between said top flexible planar member and said bottom flexible planar member such that the obverse of each flexible planar member is adjacent to the reverse of its respective adjacent flexible planar member, said stack and said flexible planar members defining:

i) at least three edges;

ii) at least one border area on the obverse of said members, said border area being adjacent to one of said edges;

iii) an image area on said obverse of said flexible members, said image area being adjacent to said border area;

(c) printing information on said image area of each of said flexible members, said information being printed as a plurality of stripes, said stripes defining a picture with a plurality of portions on each of said members, and said information being generated from a picture taken at a different point in time, said information on each of said flexible members each representing one of a plurality of images representing successive images in a motion sequence, said flexible planar members disposed in an order one on top of the other, and said images being disposed in said same order, a first of said images depicting a scene at a first point in time disposed on a first flexible planar member and each successive image of said scene at a successive point in time disposed on each successive flexible planar member, said images being of an exciting subject, said images corresponding to substantially uniform changes in action represented by said successive images;

(d) printing advertising material on said flexible planar members; and (e) binding said flexible planar members to each other at said one of said edges adjacent to said border area to form a pad.

2. A method of making an advertising device as in claim 1, wherein said images of said exciting subject are framed so that principal portions of said images are placed on a portion of said image area opposite the binder structure.

3. A method of making an advertising device as in claim 2, wherein said information is obtained from a video recording.

4. A method of making an advertising device as in claim 1, wherein said flexible planar members are paper.

5. A method of making an advertising device as in claim 1, wherein said flexible planar members are coated paper.

6. A method of making an advertising device as in claim 1, wherein said flexible planar members are plastic.

7. A method of making an advertising device as in claim 1, wherein said advertising material comprises a second set of images on the obverse of said members depicting a motion sequence.

8. A method of making an advertising device as in claim 1, wherein said exciting subject is a sporting event.

9. A method of making an advertising device, as in claim 1, wherein said exciting subject is a fishing event.

10. A method of making an advertising device as in claim 1, wherein said plurality of flexible planar members have a length and a width dimensioned such that said top flexible planar member's length is slightly shorter than the flexible planar member adjacent to it and each successive flexible planar member's length is slightly shorter than the next adjacent flexible planar member so that said top flexible planar member is the shortest and said bottom flexible planar member is the longest of said plurality of flexible planar members.

11. A method of making an advertising device as in claim 1, wherein said information is obtained from a video recording.

12. An advertising device, comprising:

(a) a plurality of flexible planar members having obverse and reverse sides, said flexible planar members being positioned one on top of the other in a stack with one of said flexible planar members positioned at the top of said stack and another of said flexible planar members being positioned at the bottom of said stack and the remainder of said flexible planar members being positioned between said top and said bottom flexible planar members with the reverse of said top flexible planar member being adjacent to the obverse of the next flexible planar member in said stack and the obverse of said bottom flexible planar member of said stack being adjacent to the reverse of the flexible planar member above said bottom flexible planar member, and the remaining flexible planar members being positioned in between said top flexible planar member and said bottom flexible planar member such that the obverse of each flexible planar member is adjacent to the reverse of its respective adjacent flexible planar member, said stack and said flexible planar members comprising:
   i) at least three edges;
   ii) at least one border area on the obverse of said members, said border area being adjacent to one of said edges;
   iii) an image area on said obverse of said flexible members, said image area being adjacent to said border area;
   iv) information members disposed on said image area of each of said flexible members, said information members emulating a video raster, said information members on each of said flexible members each representing one of a plurality of images representing successive images in a motion sequence, said flexible planar members disposed in an order one on top of the other, and said images being disposed in said same order, a first of said images depicting a scene at a first point in time disposed on a first flexible planar member and each successive image of said scene at a successive point in time disposed on each successive flexible planar member, said images being of an exciting subject;

(b) binder structure securing said flexible planar members to each other at said one of said edges adjacent to said border area;

(c) advertising material disposed on said flexible planar members; and (d) an illustration of illustrations of a human digit or digits is disposed on said reverse side of said bottom flexible planar member to illustrate the position and identity of the digit for use of the advertising device.

13. An advertising device, comprising:

(a) a plurality of flexible planar members having obverse and reverse sides, said flexible planar members being positioned one on top of the other in a stack with one of said flexible planar members positioned at the top of said stack and another of said flexible planar members being positioned at the bottom of said stack and the remainder of said flexible planar members being positioned between said top and said bottom flexible planar members with the reverse of said top flexible planar member being adjacent to the obverse of the next flexible planar member in said stack and the obverse of said bottom flexible planar member of said stack being adjacent to the reverse of the flexible planar member above said bottom flexible planar member, and the remaining flexible planar members being positioned in between said top flexible planar member and said bottom flexible planar member such that the obverse of each flexible planar member is adjacent to the reverse of its respective adjacent flexible planar member, said stack and said flexible planar members comprising:
   i) at least three edges;
   ii) at least one border area on the obverse of said members, said border area being adjacent to one of said edges;
   iii) an image area on said obverse of said flexible members, said image area being adjacent to said border area;
   iv) information members disposed on said image area of each of said flexible members, said information members emulating a video raster, said information members on each of said flexible members each representing one of a plurality of images representing successive images in a motion sequence, said flexible planar members disposed in an order one on top of the other, and said images being disposed in said same order, a first of said images depicting a scene at a first point in time disposed on a first flexible planar member and each successive image of said scene at a successive point in time disposed on each successive flexible planar member, said images being of an exciting subject;

(b) binder structure securing said flexible planar members to each other at said one of said edges adjacent to said border area;

(c) advertising material disposed on said flexible planar members; and (d) an illustration of illustrations of a human digit or digits is disposed on said obverse side of said top flexible planar member and an illustration or illustrations of a human digit or digits is disposed on said reverse side of said bottom flexible planar member to illustrate the position and identity of the digit for use of the advertising device.

* * * * *